Dec. 15, 1970     R. H. KENNY     3,546,897
OVERLOAD DEVICE
Filed June 25, 1969
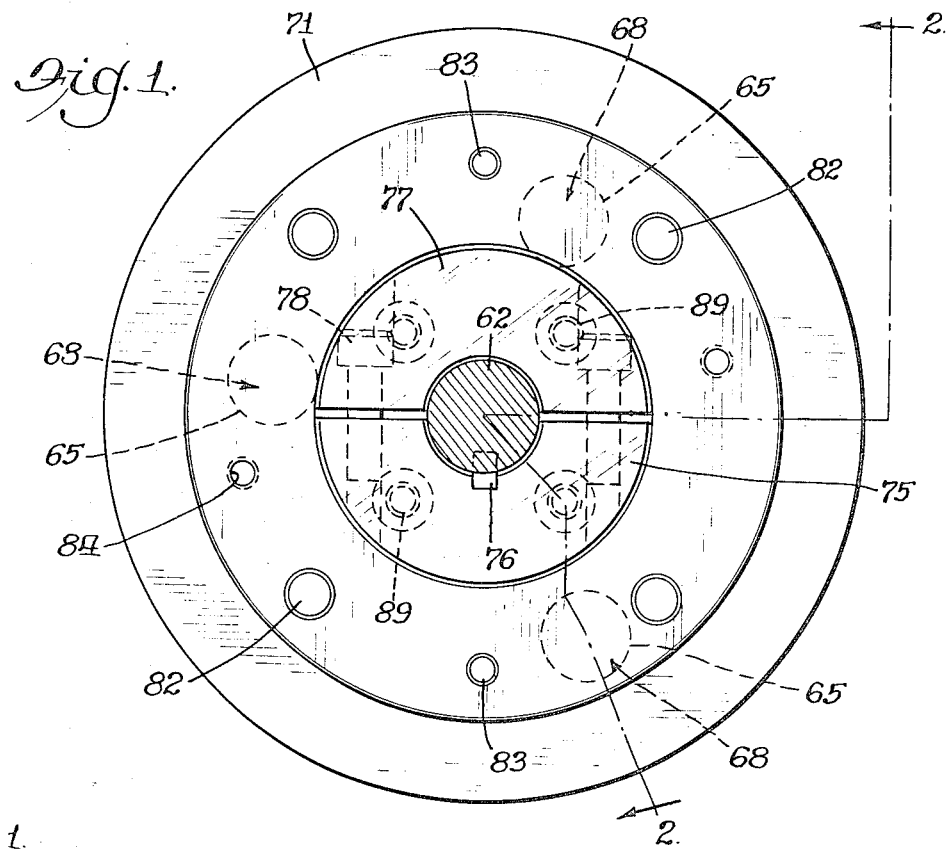
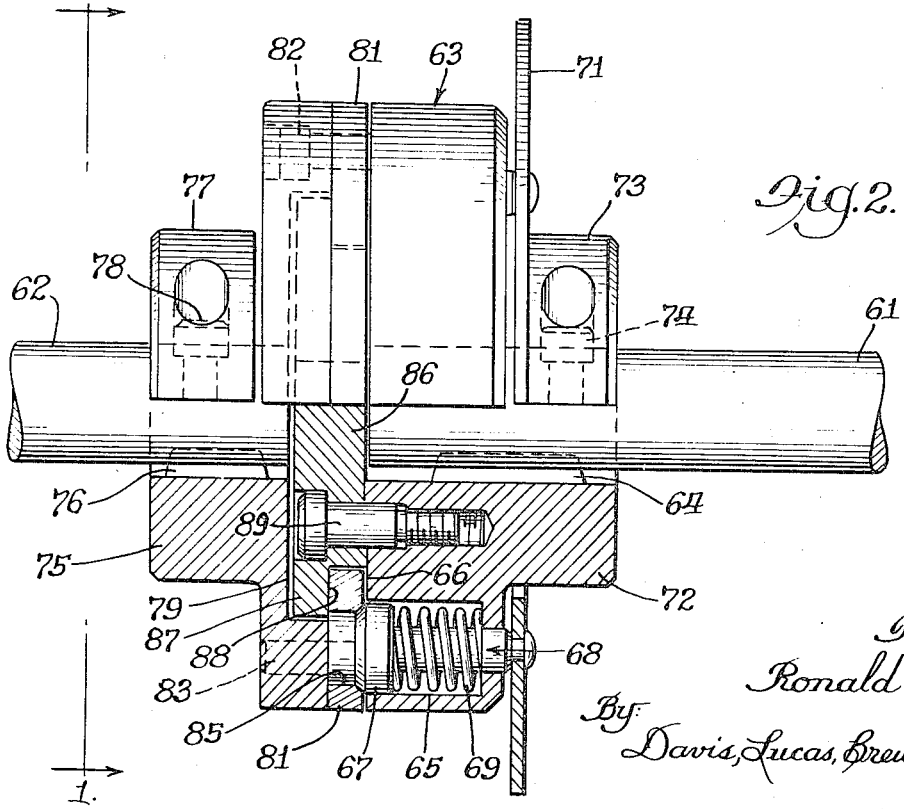
Inventor:
Ronald H. Kenny
By Davis, Lucas, Brewer & Brugman
Attys.

United States Patent Office 3,546,897
Patented Dec. 15, 1970

3,546,897
OVERLOAD DEVICE
Ronald H. Kenny, Addison, Ill., assignor to Commercial Cam & Machine Company, Chicago, Ill., a corporation of Illinois
Filed June 25, 1969, Ser. No. 836,278
Int. Cl. F16d 7/00, 43/20
U.S. Cl. 64—29
5 Claims

ABSTRACT OF THE DISCLOSURE

Overload device comprising a rotatable driving body with spring-urged plungers drivingly engaging apertures in a wear plate attached to a driven member, whereby specific torque resistance effects declutching, the driving body being shaft-mounted by means of a main hub portion integral therewith and keyed to a driving shaft and an auxiliary hub portion separates from the main portion and secured thereto by bolts to clampingly engage the shaft, and a second hub means for attaching the driven member to a driven shaft including a main hub portion carrying the wear plate and having an enlarged bore adjacent thereto for loosely receiving a peripheral flange on a retainer plate which is bolted to the driving body, whereby frictional wear during declutching is confined, in addition to that resulting from relative movement between the plungers and the wear plate, to annular surface engagement between the wear and retainer plates to avoid declutching wear of the hub means.

BACKGROUND OF THE INVENTION

Field of the invention

This invention relates generally to overload clutches, and more particularly to the adaptation of those of the detent type to shaft mounting and to use as couplings.

Description of the prior art

The most pertinent prior art patent showing an overload clutch employing detents in the form of plungers having tapered button ends or heads is No. 3,282,387, isued Nov. 1, 1966, which discloses an overload clutch using plungers, instead of the common balls, which are axially slidable in a rotatable body or plate and have tapered heads engaging correspondingly chamfered apertures in a wear plate secured to a driven member. This is a flange-mounted device, the plunger-carrying body or plate being secured to a driving member by bolts extending parallel to the axis of rotation. In order to facilitate mounting of such a device directly on a driving shaft, a modification was developed in which the plunger-carrying plate or body (14 in that Pat. 3,282,387) was constructed with a split hub portion for receiving the shaft and a clamping screw for drawing the split hub together to clamp the same to the shaft. It has been found that such clamping of the split portion of the body to the shaft results in angularly displacing the position of one or more of the plungers relative to their associated wear plate apertures sufficiently to seriously affect the operation of the overload device, both in changing its rated release torque and preventing reseating of the plungers after declutching.

Then to adapt the overload clutch mechanism of No. 3,282,387 to use as an overload clutch coupling, this same type of slit hub portion was employed, the driving cap (18 of 3,282,387), which is secured by bolts 16 to the plunger-carrying body or plate 14, being reconstructed to make it into a split shaft-engaging hub for carrying the wear plate 26. This required those securing bolts to be relocated radially outwardly from their position in the structure of that patent and providing a hub-retaining outer ring secured by the bolts to the plunger-carrying body, which, in turn, required the releasable plungers 42 to be correspondingly relocated radially inwardly. This had the very distinct disadvantage of rendering more difficult the accurate and proper positioning of the plunger-receiving apertures in the body and the wear plate, since the result of any extremely slight arcuate misplacement of an aperture center is magnified in inverse proportion to the diameter of the circle of rotation therethrough. And during de-clutching, the resulting relative movement between the outer ring and the hub was found to cause excessive frictional wear of the hub.

SUMMARY OF THE INVENTION

This invention has overcome these objectionable features of the prior art and has successfully adapted the flange-mounted overload clutch of No. 3,282,387 to shaft mounting and to function as an overload clutch coupling. The shaft mounting has been rendered completely satisfactory by eliminating angular displacement of the plungers in such an overload clutch mechanism due to clamping engagement thereof to a shaft, which thereby insures proper operation, including declutching when a specific torque resistance is encountered and a subsequent accurate reseating of the plungers. This is accomplished by providing separate shaft-engaging hub portions including a main portion and an auxiliary portion secured thereto only by clamping bolts.

The invention also insures maximum accuracy in the placement of the plunger-receiving apertures when the overload clutch mechanism is employed as a coupling by enabling the center of those apertures to be disposed a maximum distance from the center of rotation of the shaft. This is accomplished by attaching the outer portion of the wear plate to a shaft-clamping hub and enlarging the bore of the latter adjacent the wear plate to loosely receive therebetween a peripheral flange on a retainer plate that is secured to the plunger-carrying plate or body by bolts parallel to and disposed radially inwardly from the plungers. This novel arrangement comprises an overload clutch coupling which is stronger though less expensive than the prior couplings and minimizes wear during declutching by limiting relative frictional movement, in addition to that between the plungers and the wear plate, to that resulting between an annular portion of the outer surface of the wear plate and the retainer plate. Consequently, there is no wear of the shaft-clamping hub when such a retainer plate is employed, and frictional resistance may readily be minimized during declutching by making the retainer plate of cast iron while hardened steel is still used for the wear plate.

In the drawing:

FIG. 1 is an end elevational view of an overload device embodying the invention as seen from the driven side thereof, in the direction indicated by the arrows 1—1 in FIG. 2; and FIG. 2 is a view partly in side elevation and partly in section, approximately on the line 2—2 of FIG. 1.

DESCRIPTION OF THE PREFERRED EMBODIMENT

Referring more particularly to the drawings, a specific embodiment of the invention is illustrated as an overload clutch coupling for interconnecting a driving shaft 61 and a driven shaft 62 and comprising a rotatable driving body, indicated generally by reference numeral 63, having a bore for receiving an end of the driving shaft and keyed thereto, as by a key 64 (FIG. 2). This body 63 is functionally equivalent to the plate 14 of No. 3,282,387 and, like the latter, is provided with a plurality of apertures 65 extending parallel to the bore and the axis of rotation inwardly from an end surface 66 (FIG. 2) and spaced from each other circumferentially of the body (FIG. 1). Each aperture 65 slidably houses the enlarged detent head 67 (FIG. 2) of a plunger 68 and a coil spring 69 which is interposed between the plunger head 67 and a shoulder formed by a reduced outer end of the aperture 65. These parts 65, 67, 68 and 69 are similar to those identified in 3,282,387, respectively, as 34, 46, 42 and 48. And as in the patent, the outer ends of the stems of the plungers 68 may be secured to a detector plate 71 for signaling declutching that has resulted from an overload. Hub means are provided for mounting the body 63 on the shaft 61 and securing it thereto, which comprises a substantially semi-cylindrical main portion 72 (FIG. 2) integral with the body and keyed therewith by key 64 to the shaft, and a substantially semi-cylindrical auxiliary portion 73 secured thereto by a pair of clamping bolts 74 to clampingly engage the shaft 61.

The illustrated embodiment of the invention also includes a similar second hub means as part of a driven member comprising a main portion 75 keyed to the driven shaft 62 by a key 76 and a substantially semi-cylindrical auxiliary portion 77 secured to the outer part thereof by a pair of clamping bolts 78 for clampingly engaging and end of shaft 62 therebetween. The inner part of the main portion 75 is cylindrical with an enlarged bore 79 (FIG. 2) and has an annnular wear plate 81 secured to its end surface by four screws 82 and a pair of diametrically opposed dowels 83 which are disposed in aligned apertures in the driven member 75 and the wear plate 81 and correspond to the dowel pins 32 in 3,282,387. The screws 82 materially strength the connection of the wear plate 81 to the driven member 75, and a pair of diametrically opposite tapped holes 84 (FIG. 1) extend through the inner cylindrical or flange portion of the member 75 for temporarily receiving suitable "lift-off" screws (not shown) which may be turned inwardly against the wear plate 81, after removal of screws 82, to disassemble the device and effect removal of the wear plate when desired.

The wear plate 81 is provided with chamfered recesses 85 (FIG. 2) in its inner end surface normally aligned, respectively, with the apertures 65 in the end surface 66 of the plunger-carrying body 63 for drivingly receiving the detent heads 67 of the plungers 68. It thus will be appreciated that with the driving member or body 63 and the driven member 75 and its connected wear plate 81 in the normal position shown in FIG. 2, rotation of shaft 61 will be transmitted to shaft 62 by the plungers 68, as maintained in driving position by the springs 69. As soon as a resistance is imposed upon the driven shaft 62 sufficient to exceed the rated release torque of the device, as determined by the springs 69 and the plunger heads 67 and the recesses 85, the plungers 68 will be moved axially against their springs to effect declutching and permit relative rotation between the shafts 61 and 62. Since the outer ends of the plungers 68 are connected to the detector plate 71, the latter will be moved correspondingly relative to the driving body 63 during declutching to signal the same or to be employed to effect any action desired to be accomplished because of the overload.

Means are provided to secure the driving and driven portions of the device together in operative relationship which comprises a retainer plate 86 (FIG. 2) having a peripheral flange 87 loosely received in the enlarged bore 79 in the main hub portion of the driven member 75 and defining an annular surface 88 parallel to the end surface 66 of the body 63. This annular surface 88 engages the wear plate 81, and the retainer plate 86 is secured to the plunger-carrying body 63 by a plurality of bolts 89 parallel to and disposed radially relative to the center of rotation inwardly from the plungers 68 (FIG.1). The several parts are so dimensioned that there are clearances between the end surface 66 of the body 63 and the outer side surface of the wear plate 81, the inner peripheral surface of the wear plate 81 and the retainer plate 86, and the retainer plate 86 and the main portion 75 of the driven member, so that during declutching relative movement between the driving parts 63, 86 and the normally driven parts 75, 81, the only frictional contact, other than between the heads 67 of the plungers 68 and the wear plate 81, will be between the annular surface 88 of the retainer plate 86 and the wear plate 81.

I claim:

1. In a device of the class described comprising a rotatable driving body with a plurality of apertures extending parallel to the axis of rotation inwardly from an end surface and spaced from each other circumferentially thereof, a plunger disposed in each said aperture with a head spring-urged outwardly therefrom, and a wear plate attachable to a driven member and having apertures for receiving the heads of said plungers for being rotatably driven thereby; a shaft, and hub means for mounting said device on said shaft, comprising a main portion keyed to said shaft, an auxiliary portion separate from said main portion, and clamping bolts for securing said auxiliary portion to said main portion and clampingly engaging said shaft therebetween.

2. In a device according to claim 1, a retainer plate secured to said driving body by bolts parallel to and disposed radially inwardly from said plungers and having a peripheral flange defining an annular surface parallel to said body end surface for alone frictionally engaging said wear plate during declutched relative movement between said driving body and said wear plate.

3. A device according to claim 2, wherein said driven member comprises a second hub means attachable to a driven shaft and having an enlarged bore adjacent said wear plate for loosely receiving said peripheral flange of said retainer plate.

4. A device according to claim 3, wherein said second hub means comprises a main portion keyed to said driven shaft, an auxiliary portion separate from said main portion, and clamping bolts for securing said auxiliary portion to said main portion and clampingly engaging said driven shaft therebetween.

5. A device according to claim 1, wherein said main hub portion is integral with said driving body.

References Cited

UNITED STATES PATENTS

| 2,443,213 | 6/1948 | Weber | 64—29 |
| 2,959,945 | 11/1960 | Hugo et al. | 64—29 |
| 3,282,387 | 11/1966 | Becker et al. | 64—29X |
| 3,379,034 | 4/1968 | Gustafson | 64—29 |

ALLAN D. HERRMANN, Primary Examiner

U.S. Cl. X.R.

192—56